Patented Apr. 23, 1946

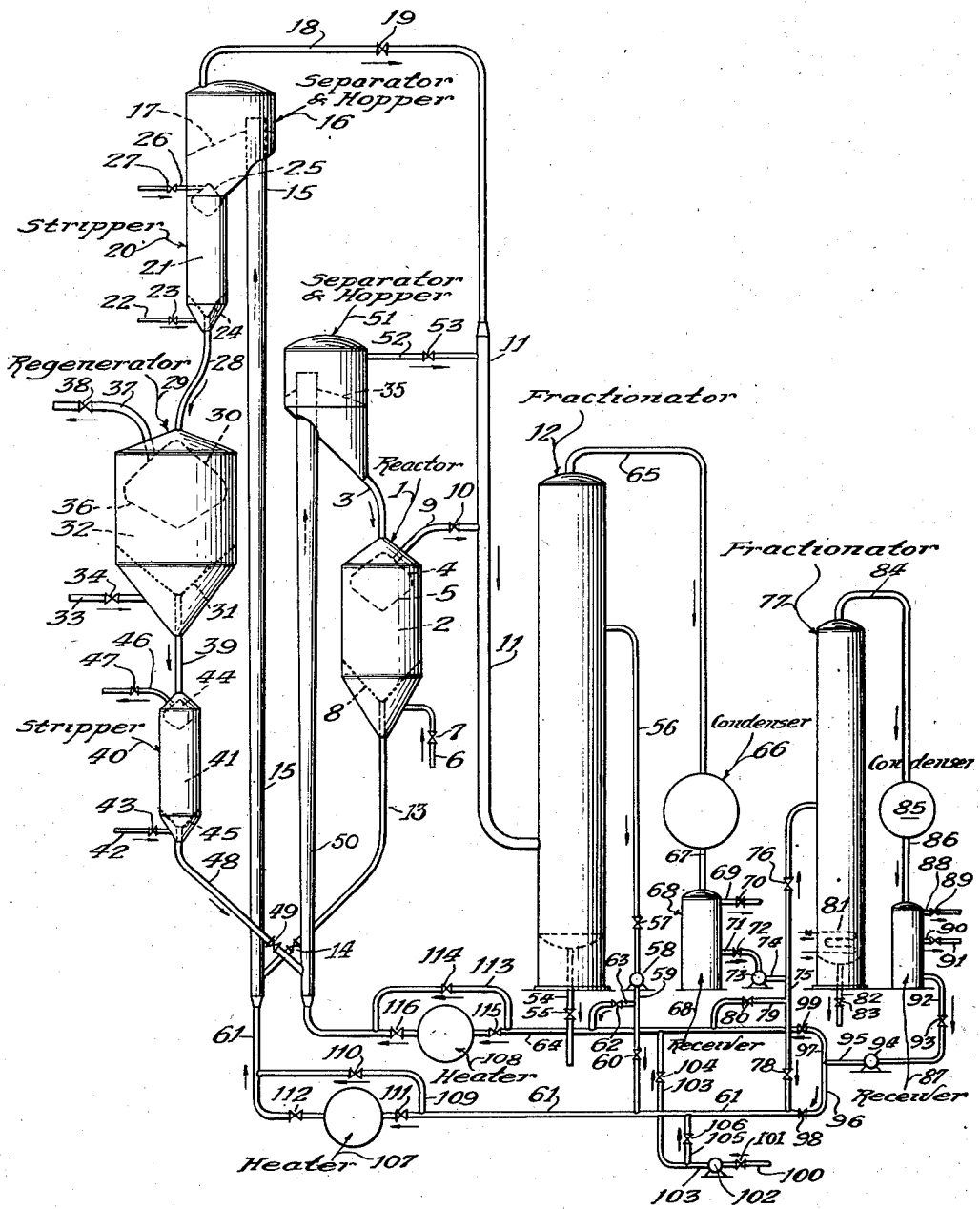

2,398,759

UNITED STATES PATENT OFFICE 2,398,759

CONVERSION OF FLUID HYDROCARBONS

Charles H. Angell, Chicago, Ill., assignor to Universal Oil Products Company, Chicago, Ill., a corporation of Delaware Application April 27, 1944, Serial No. 532,952

16 Claims. (Cl. 196—52)

The invention is directed to an improved process for the conversion of fluid hydrocarbons in the presence of a mass of solid particles which accumulate deleterious combustible products of the hydrocarbon conversion reaction and require regeneration to remove such contaminants. The solid particles of contact material employed may possess catalytic activity for promoting or directing the hydrocarbon conversion reaction or they may consist of relatively inert material of a refractory nature capable of withstanding the operating conditions encountered in the process, or they may comprise a reagent which enters into the reaction.

The hydrocarbon conversion reactions particularly contemplated by the invention are of an endothermic nature which result in the accumulation of a substantial quantity of combustible contaminants by the solid contact material. The regenerating step of the process is of an exothermic nature comprising, for example, burning of the combustible contaminants from the contact material with a resulting storage of heat in the latter. The process involves the use of separate confined reaction and regenerating zones through which the solid particles of catalyst or contact material are circulated in series, with a resulting transfer of heat stored in the solid particles from the regenerating zone to the reaction zone. In many operations of this general type the quantity of heat stored in the solid particles undergoing regeneration is greater than that which it is necessary or desirable to transfer from the regenerating step to the reaction step and the invention is particularly concerned with operations of this nature and with an improved method for abstracting heat from the circulating mass of solid particles in one or more zones of their circuit exterior to the reaction and regenerating zones.

The invention is further particularly concerned with an improved method for effecting the flow of solid particles in their circuit between and through the reaction and regenerating zones. This improved mode of circulation involves the use of a transporting fluid which exerts a gas-lift action on the solid particles. As a special feature of the invention, the transporting fluid employed also serves as a direct contact cooling medium for the solid particles which it transports. To accomplish this cooling of the solid particles by their transporting fluid, a relatively low-boiling hydrocarbon or mixture of hydrocarbons is employed as the transporting fluid and is supplied to the gas-lift transfer line, wherein it serves as transporting fluid, at a substantially lower temperature than that at which the solid particles to be transported are supplied thereto. The relatively hot solid particles thus impart heat to the transporting fluid and are correspondingly cooled as they pass through the transfer line.

The transporting fluid selected comprises a hydrocarbon or hydrocarbon mixture which is readily vaporized and which will not be detrimentally converted to any substantial extent by contact with the relatively hot solid particles which it transports. Light condensate or distillate fractions produced within the system, as well as relatively heavy normally gaseous fractions, are suitable for use as the transporting fluid. In the preferred embodiment of the invention they are advantageously pumped in liquid state, thereby avoiding the use of costly compression for imposing thereon the pressure required at the inlet end of the gas-lift transfer line. The transporting fluid may be heated and vaporized prior to its introduction into the transfer line by any suitable conventional method or it may be initially contacted with the hot solid particles in essentially liquid state. In the latter case, heat of vaporization for the transporting fluid will be furnished by the hot solid particles and cooling of the latter by the transporting fluid will be correspondingly augmented. When the transporting fluid is heated and vaporized prior to its contact with the solid particles which it transports, the temperature to which it is preheated is kept sufficiently below that of the solid particles to be commingled therewith that the latter are cooled to the desired degree in the transfer line.

It is also within the scope of the invention to employ as transporting fluid light normally liquid or relatively heavy normally gaseous hydrocarbons initially derived from an external source. In such instances, all or a substantial portion of the transporting fluid employed may be recovered in suitable fractionating and condensing equipment to which it is supplied following its separation from the solid particles and may be returned from this equipment to the gas-lift transfer line, establishing a closed cycle of transporting fluid within the system.

One specific hydrocarbon conversion reaction to which the features of the invention are particularly well adapted is the catalytic cracking of hydrocarbon oil. The following more detailed description of the process will therefore be directed to a catalytic cracking operation and will serve to more concretely illustrate the features and advantages of the invention.

The accompanying diagrammatic drawing is an elevational view of one specific form of apparatus embodying the features of the invention and in which the process provided by the invention may be successfully conducted.

Referring to the drawing, the apparatus here illustrated comprises a reaction vessel 1 in which a relatively compact bed 2 of downwardly moving solid particles of cracking catalyst is maintained. Active cracking catalyst particles are supplied to the upper portion of the reactor through conduit 3, as will be later described, and are directed outwardly and downwardly over an imperforate substantially cone-shaped member 4 provided within the upper portion of the reactor. The incoming catalyst particles are thus directed about the outer periphery of member 4 into the upper portion of bed 2 and the upper extremity of this bed, indicated at 5, assumes an inverted substantially conical contour having a slope approximately corresponding to the angle of repose of the solid particles. The solid catalyst particles pass downwardly through bed 2 countercurrent to a stream of vaporous hydrocarbon reactants to be converted and resulting vaporous and gaseous conversion products.

The fluid reactants to be converted, which comprise in this instance hydrocarbon oil to be cracked, are supplied to the lower portion of reactor 1, preferably in essentially vaporous state, through line 6 and valve 7. A suitable perforate cone-like member 8, which serves as a screen and as a distributing grid for the incoming reactants, is disposed within the lower portion of the reactor and has a slope slightly steeper than the angle of repose of the solid particles. The incoming reactants are substantially uniformly distributed over the cross-section of bed 2 as they enter the latter through member 8 and the substantially corresponding contour of the catalyst bed at its upper and lower ends materially assists in preventing channeling or short-circuiting of vapors and gases through any portion of the bed by eliminating a path of travel through any portion of the bed which is materially shorter than that in any other portion thereof.

Suitable cracking conditions of temperature, pressure, space velocity and catalyst-oil ratio for effecting the catalytic cracking of the particular charging stock employed are maintained within bed 2 in the reactor. Vaporous and gaseous conversion products are directed from the upper extremity of bed 2 into the space provided above the latter and beneath member 4. They are thence directed through line 9, valve 10 and line 11 to fractionation in fractionator 12, as will be later described. The term "space velocity" as herein used may be defined as pounds of hydrocarbon reactants passed through the reaction zone per hour, per pound of catalyst present in the catalyst bed. The term "catalyst-oil ratio" as herein used may be defined as pounds of catalyst supplied to the reaction zone in a given time, per pound of reactants supplied thereto.

The selection of suitable operating conditions within the reaction zone for the particular charging oil and the particular type of catalyst employed is within the skill of those familiar with the art and does not constitute a novel part of the invention. In general, the average cracking temperature employed in the reactor may range from 800 to 1025° F., or thereabouts, with a space velocity of from about 1 to about 12 and with a catalyst-oil ratio of from 2 to 20 or more. The pressure employed at the vapor outlet of the reactor is sufficient to overcome the pressure drop through the succeeding fractionating and recovery equipment which, in most instances, is within the approximate range of 6 to 12 pounds gauge, superatmospheric. A higher pressure ranging up to 100 pounds gauge, or more, may be employed, when desired, particularly in case the process is operated for the production of motor gasoline, but ordinarily a relatively low superatmospheric pressure is preferred in order to avoid excessive thermal cracking. The reactants are supplied to the reaction zone at a pressure sufficiently higher than that employed at the vapor outlet to overcome the pressure drop through the catalyst bed. In most instances this difference in vapor pressure between the inlet and outlet ends of the bed will be within the range of 1 to 3 pounds gauge.

The catalyst particles passing through bed 2 in the reactor accumulate deleterious combustible contaminants which must be burned therefrom in the regenerating step to restore the catalyst to the desired degree of activity. The contaminated catalyst is withdrawn from the bed at the lower end of member 8 and directed in the form of a relatively compact stream or column through conduit 13 and through an adjustable orifice or flow control valve 14 provided in this conduit adjacent its lower end into a straight substantially vertical gas-lift transfer line 15.

In line 15 the catalyst particles meet and are dispersed in an ascending stream of transporting fluid, of the nature previously mentioned, which exerts a gas-lift action on the solid particles and transports them upwardly through line 15 to a separating vessel and hopper 16. Vessel 16 is disposed at a suitable elevation above the regenerator and is operated at a lower pressure than that prevailing at the inlet end of transfer line 15.

In vessel 16 the upward velocity of the transporting vapor or gas is reduced sufficiently that the solid particles which it transports into this zone are largely separated therefrom by gravity. The separated solid particles are collected in the hopper-like lower portion of vessel 16 in the form of a relatively compact bed, the approximate upper extremity of which is indicated at 17. The transporting vapor or gas from which all or substantially all of the catalyst particles have been separated in vessel 16 is directed from the upper portion thereof through line 18 and valve 19 and, in the particular case illustrated, is directed through line 11 into fractionator 12.

It is, of course, within the scope of the invention to supply the transporting gas or vapor from separator 16 to other suitable equipment, such as, for example, a separate fractionator or condenser for recovering the transporting fluid in liquid state. This may be done, particularly in case it is not desired to commingle the transporting fluid with the vaporous conversion products discharged from reactor 1. Alternatively, and depending upon the particular nature and boiling characteristics of the transporting fluid, it may be supplied to the condensing or to the gas concentrating equipment succeeding fractionator 12 without passing through the latter zone.

The bed of catalyst collected in vessel 16 will contain some occluded and adsorbed volatile hydrocarbons which may be advantageously separated from the catalyst particles before the latter are supplied to the regenerating step so as to avoid burning these valuable light hydrocarbons in the latter zone. To substantially purge or strip the catalyst of these occluded and adsorbed volatile hydrocarbons, a stripping vessel 20 is provided, in the case illustrated, within the path of flow of the catalyst passing from vessel 16 to the regenerator. In this particular instance stripper 20 comprises a depending leg or column attached to vessel 16 and the catalyst passes therethrough in the form of a relatively compact bed 21 countercurrent to a stream of suitable stripping gas, such as steam, for example, which is supplied to the lower portion of the stripper through line 22 and valve 23.

A suitable distributing member 24, similar in form and function to member 8 in reactor 1, is provided in the lower portion of stripper 20 and a member 25, similar in form and function to member 4 in reactor 1, is provided in the upper portion of the stripper. Stripping gas and stripped-out volatile hydrocarbons are discharged from the space provided beneath member 25 and above the upper extremity of bed 21 through line 26 and valve 27 to suitable equipment for recovering the stripped-out volatiles. This equipment may conveniently be the same as that to which transporting fluid is supplied from the upper portion of vessel 16, in which case lines 18 and 26 will be interconnected by well known means, not shown.

Contaminated catalyst substantially stripped of occluded and adsorbed volatile hydrocarbons is directed downwardly from the lower portion of bed 21 in stripper 20 through conduit 28 in the form of a relatively compact stream or column and is introduced into the upper portion of regenerator 29. The regenerator, in the case illustrated, is a vessel of substantially the same form as reactor 2, but of somewhat larger diameter. It is provided with members 30 and 31 which are similar in form and function to the respective members 4 and 8 in the reactor. A relatively dense bed 32 of downwardly moving catalyst particles is maintained within the regenerator and oxidizing gas such as air or air diluted with relatively non-combustible gas is supplied to the lower portion of the regenerator through line 33 and valve 34 and is directed upwardly into bed 32 through member 31 to burn combustibles from the bed and regenerate the catalyst. Resulting gaseous products of regeneration are discharged from the upper extremity of bed 32, which is indicated approximately at 36, into the space provided above the bed and beneath member 30. These gases are thence discharged through line 37 and valve 38, preferably to suitable heat recovery equipment, not illustrated, such as, for example, a waste-heat boiler, steam superheater, hot gas turbine or the like, for the recovery of readily available heat energy from the gases.

Suitable operating conditions of temperature, pressure and catalyst residence time are maintained in the regenerating zone for effecting the removal of all or a substantial portion of the combustible contaminants from the catalyst and thus restoring its activity to the desired degree so that it may be further used in promoting the cracking reaction. Here again the selection of suitable operating conditions is within the skill of those familiar with the art. Care is exercised to avoid heating of the catalyst in the regenerating step to such a high temperature that damage or permanent impairment to its activity would result. This maximum temperature may range from 1000 to 1300° F., depending upon the particular type of catalyst employed. Synthetically prepared catalysts of the silica-alumina type, from which alkali metal compounds have been substantially completely removed during their preparation, and treated natural clays or partially synthetic catalysts which have been treated for the removal of alkali metal compounds, will withstand higher temperatures than natural clay type catalysts and the like.

In the regenerator, as in the reactor, there will be some temperature gradient from top to bottom of the catalyst bed and the average temperature maintained within the bed will ordinarily be within the range of 900 to 1100° F., or thereabouts. The regenerating gas passing through the bed will also encounter some resistance and pressure drop and, preferably, the gases leave the regenerator at a sufficient superatmospheric pressure to overcome the resistance to flow encountered in any heat recovery equipment to which they are supplied. In most operations the gas outlet pressure from the regenerator will be within the range of 1½ to 12 pounds gauge and it may advantageously be substantially the same as the vapor outlet pressure from the reactor.

The rate at which oxidizing gas is supplied to the regenerator and its free oxygen content are preferably sufficient to effect the substantially complete removal of combustible contaminants from the catalyst in this zone. When, as in the preferred embodiment of the invention here illustrated, the catalyst bed in the regenerator is maintained in a relatively compact condition, so as to secure countercurrent flow and efficient contact between the regenerating gas and the catalyst particles passing through the bed, the size of the regenerator is such that the residence time for the catalyst in bed 32 at the catalyst flow rate employed is sufficient to preclude the necessity for employing regenerating gas velocity through the bed which would cause substantial turbulence and hindered settling of catalyst particles. The critical velocity at which turbulence and hindered settling will begin to take place is one which will give a gas pressure drop through the bed substantially corresponding to the density of the bed. This condition is therefore avoided when a relatively compact bed is to be maintained within the regenerator. The same applies to the vapor-gas velocity through the bed in the reactor when a relatively compact catalyst bed is to be maintained in this zone.

Regenerated catalyst in which heat has been stored as a result of the burning operation in the regenerator is directed downwardly from the lower portion of bed 32 through conduit 39 in the form of a relatively compact stream or column. This catalyst stream or column will contain some occluded and adsorbed oxidizing gas and gaseous products of combustion which preferably are substantially stripped therefrom before the catalyst is returned to the reaction zone. The transfer of such occluded gases to the reactor with the catalyst would contaminate the hydrocarbon conversion products with non-condensible components and increase the required size of the gas concentrating and separating equipment. Also, the presence of any substantial quantity of free oxygen in the reaction zone is obviously detrimental. For similar reasons it is desirable to substantially strip the occluded and adsorbed gases from the catalyst before it is commingled with the hydrocarbon transporting fluid employed for effecting its return to the reactor.

A stripper 40 is therefore provided at the location indicated in the drawing. Catalyst from line 39 passes downwardly through stripper 40 in the form of a relatively compact bed, indicated at 41, countercurrent to suitable stripping gas such as steam, for example, which is supplied to the lower portion of the stripping vessel through line 42 and valve 43. Members 44 and 45, similar in form and function to the respective members 4 and 8 in the reactor, are also provided within stripper 40. Stripping gas and stripped-out gases are discharged from the space provided beneath member 44 and above the upper extremity of bed 41 through line 46 and valve 47. These gases may, when desired, be supplied to the same heat recovery equipment to which combustion gases are supplied from the regenerator, as previously mentioned. A relatively compact stream or column of the regenerated and substantially stripped catalyst particles is directed downwardly from the lower portion of bed 41 in stripper 40 through conduit 48 and the catalyst particles pass through the adjustable orifice or flow control valve 49, provided in conduit 48 adjacent its lower end, into transfer line 50.

Line 50 is preferably, as here illustrated, a straight substantially vertical conduit. In line 50 the hot regenerated catalyst particles meet and are dispersed in a stream of suitable transporting fluid such as previously mentioned which exerts a gas-lift action on the solid particles and transports them upwardly through line 50 into the separating vessel and hopper 51. This vessel is disposed at a suitable elevation above the reactor and is operated at a lower pressure than that prevailing at the inlet end of transfer line 50.

In vessel 51, as in vessel 16, the upward velocity of the gas is reduced sufficiently that all or a major portion of the solid particles which it transports into this zone are separated therefrom by gravity. The separated solid particles collect in the hopper-like lower section of vessel 51 in the form of a relatively compact bed, the approximate upper extremity of which is indicated at 35. The separated catalyst is passed downwardly from the lower portion of vessel 51 through conduit 3 in the form of a relatively compact stream or column and flows into the upper portion of the reactor to complete the catalyst circuit through the system.

Transporting vapor or gas from which all or a major portion of the catalyst particles have been separated is discharged from the upper portion of vessel 51 through line 52 and valve 53 which, in the case illustrated, communicates with line 11 leading to fractionator 12. In case separate recovery equipment for the transporting fluid is desired, the vapor or gas stream discharged from vessel 51 may be supplied to such equipment with the vapor or gas stream discharged from vessel 16.

The vaporous and gaseous hydrocarbons supplied to fractionator 12, as previously described, are here separated into selected relatively low-boiling and high-boiling fractions. The heavier components of the vapors which are condensed within the lower portion of the fractionator are withdrawn therefrom through line 54 and valve 55 to cooling and storage or elsewhere, as desired. All or a portion of this heavy reflux condensate may, when desired, be revaporized and returned to reactor 1 for further cracking treatment in this zone.

In the case illustrated, selected lower boiling fractions of the reflux condensate formed in fractionator 12, comprising such material as heavy gasoline fractions, naphtha, kerosene, kerosene distillate or light gas oil, may be withdrawn from a suitable intermediate point in the fractionator and directed through line 56 and valve 57 to pump 58 wherefrom they may be supplied all or in part through line 59 and valve 60 into line 61 and thence into the lower portion of transfer line 15 to serve as transporting fluid therein. This light condensate may likewise be supplied, all or in part, through line 62 and valve 63 to line 64 and thence into the lower portion of transfer line 50 to serve as transporting fluid therein.

Fractionated vapors of the desired end-boiling point which comprise all or selected light gasoline fractions and which may, when desired, include somewhat higher boiling components such as kerosene or naphtha fractions are directed from the upper portion of the fractionator through line 65 to condenser 66. The condenser may be of any suitable conventional type and with the particular arrangement illustrated, substantially all of the normally liquid fractions supplied to this zone are condensed therein. The resulting distillate and uncondensed gases are directed through line 67 to collection and separation in receiver 68 which is operated under temperature and pressure conditions at which a substantial quantity of the heavy normally gaseous hydrocarbons such as butanes and butenes remain dissolved in the distillate collected therein. The remaining uncondensed and undissolved gases are discharged from receiver 68 through line 69 and valve 70, preferably to suitable absorption and separating equipment, not illustrated.

The gas-containing distillate collected in receiver 68 is supplied therefrom through line 71 and valve 72 to pump 73 from which all or a regulated portion is directed through line 74, line 75 and valve 76 into fractionator 77 which in this instance is operated as a stabilizer or debutanizer. A regulated quantity of the distillate withdrawn from receiver 68 may be employed as transporting fluid in transfer lines 15 and 50. When so used in transfer line 15 it may be supplied thereto from pump 73 via line 74, line 75, valve 78 and line 61. When thus used in transfer line 50 it may be supplied thereto from pump 73 via line 74, line 75, line 79, valve 80 and line 64.

Heat is supplied to the lower portion of fractionator 77 to reboil the liquid fractions collected therein and liberate therefrom all or any desired portion of the dissolved gases. This is accomplished in the particular case illustrated by passing a suitable heating medium such as steam, hot oil or the like through a closed coil 81 within the lower portion of the fractionating column. The resulting gasoline fractions stabilized to the desired vapor pressure or substantially stripped of normally gaseous components are withdrawn from the lower portion of fractionator 77 through line 82 and valve 83 and may be supplied to cooling and storage or to any desired further treatment.

It is also within the scope of the invention to utilize regulated quantities of the stabilized or substantially gas-free distillate from fractionator 77 as transporting fluid in transfer lines 15 and 50. This may be accomplished by providing a suitable pump in line 82 and branch lines connecting the same with lines 61 and 64. However, since provision is made for employing unstabilized distillate from receiver 68 as transporting fluid it is not considered necessary to illustrate the provisions for supplying stabilized distillate to the transfer lines.

Normally gaseous fractions liberated from the distillate in fractionator 77, which in this particular instance consist principally of $C_4$ hydrocarbons but which may, when desired, include some lower boiling and higher boiling fractions, are directed from the upper portion of fractionator 77 through line 84 to condenser 85. All or a substantial portion of the relatively heavy gases are liquefied in condenser 85 and the resulting liquid fractions and uncondensed gases are directed through line 86 to collection and separation in receiver 87. Uncondensed gases are released from the receiver through line 88 and valve 89 and may, when desired, be supplied to the same recovery equipment, not illustrated, to which uncondensed gases are supplied from receiver 68. All or a portion of the liquefied normally gaseous fractions collected in receiver 87 may be directed therefrom through line 90 and valve 91 to storage or elsewhere, as desired.

The invention specifically contemplates the use of normally gaseous fractions produced within the system, such as $C_4$ hydrocarbons, for example, as transporting fluid in transfer lines 15 and 50. Provision is made for directing such normally gaseous fractions in liquid state from receiver 86 through line 92 and valve 93 to pump 94 from which they may be supplied through line 95 and the respective branch lines 96 and 97, containing the respective valves 98 and 99, into the respective lines 61 and 64 and thence to one or both of the respective transfer lines 15 and 50.

It is also within the scope of the invention, as previously mentioned, to employ relatively light oil or relatively heavy normally gaseous fractions from an external source as transporting fluid within the system. Such extraneous transporting fluid may comprise readily liquefiable normally gaseous hydrocarbons, gasoline or naphtha fractions, kerosene, kerosene distillate, light gas oil and the like or any desired mixture of such materials. It may be supplied through line 100 and valve 101 to pump 102 and fed therefrom in essentially liquid state through line 103 and valve 104 into line 64 and thence supplied to transfer line 50 and/or through line 105 and valve 106 into line 61 and thence to transfer line 15.

In order to control the temperature of the transporting fluid supplied to the respective transfer lines 15 and 50, a heater 107 of any suitable conventional form is interposed in line 61 and a similar heater 108 is interposed in line 64. These heaters are provided for the purpose of increasing the temperature of the transporting fluid sufficiently that it will not excessively cool the catalyst particles with which it is commingled in the transfer lines. When this required temperature is above the vaporization point of the transporting fluid at the pressure employed at the lower ends of transfer lines 15 and 50, the transporting fluid will, of course, be supplied to the transfer lines in essentially vaporous or gaseous state. Otherwise, all or a substantial portion of the required heat of vaporization will be supplied to the transporting fluid by the hot solid particles with which it is commingled in the transfer lines. Provision is made for by-passing heater 107, when desired, by passing the fluid flowing through line 61 about the heater through line 109 and valve 110, valve 111 and valve 112 in line 61 being entirely or partially closed. A similar by-pass line 113, containing valve 114, is provided for diverting all or a portion of the fluid passing through line 64 about heater 108, when desired, valve 115 and valve 116 in line 64 being closed to the desired extent. When heaters 107 and 108 are not employed the transporting fluid will be supplied to the transfer lines in essentially liquid state and the heat required for vaporization of the transporting fluid will be abstracted from the hot solid particles with which they are commingled in the transfer lines.

It is within the scope of the invention to eliminate either transfer line 15 or transfer line 50. For example, to eliminate line 15, vessel 51 and reactor 1 may be disposed above the regenerator, preferably with a suitable stripping zone similar to stripper 40 interposed between the reactor and the regenerator. With this arrangement, transfer line 50 is, of course, extended upward to enter vessel 51 at the latter's higher elevation and the solid particles flow downwardly by gravity from vessel 51 through reactor 1, the succeeding stripper, regenerator 29 and stripper 40 into transfer line 50 through which they are returned by the gas-lift action of the transporting fluid to vessel 51 to complete their circuit through the system. To eliminate transfer line 50, reactor 1 may be disposed beneath stripper 40, vessel 51 also being eliminated and transfer line 15 being extended downwardly to join conduit 13 at the lower elevation of the latter. With this arrangement solid particles are directed downwardly by gravity from vessel 16 through stripper 20, regenerator 29, stripper 40 and reactor 1 into transfer line 15 through which they are returned by the gas-lift action of the transporting fluid to vessel 16 to complete their circuit through the system.

With transfer line 15 eliminated as above described, cooling of the catalyst by contact with transporting fluid as it passes from the reactor to the regenerator will also be eliminated. It is, of course, possible to provide an indirect-contact cooler or heat exchanger in the path of flow of the catalyst passing from the reactor into the regenerator for reducing its temperature, but I prefer to avoid the use of such catalyst coolers. Therefore, the catalyst entering the regenerator will be at a higher temperature than would otherwise prevail and the regenerator will be operated at a higher average temperature. This will simply necessitate the abstraction of an additional quantity of heat in transfer line 50 as the catalyst flows therethrough from the regenerator back toward the reactor in order to keep the desired temperature for the catalyst entering the reactor. The reverse condition occurs when transfer line 50 is eliminated as above described. In such instances a greater quantity of heat will be abstracted from the catalyst in passing through transfer line 15 from the reactor back toward the regenerator and the latter will be operated at a lower average temperature so that the catalyst supplied therefrom to the reactor will be at the desired temperature level.

In case two gas-lift transfer lines are employed, the total cooling of the catalyst preferably is accomplished partially in each of these lines and the percentage of the total cooling accomplished in each transfer line may be regulated to suit requirements and properly control the temperature of the catalyst entering the regenerator, as well as that of the catalyst entering the reactor. It is not necessary that the same transporting fluid be employed in both transfer lines and it will be noted that the arrangement illustrated in the drawing permits the use of any one or any combination of the various materials mentioned as transporting fluid in either or both of the lines 15 and 50.

As a further illustration of the features of the invention we will consider the operation of a catalytic cracking unit to which approximately 12,000 pounds of charging oil is supplied per hour. It is possible to select operating conditions in the reaction zone to give a degree of cracking which will result in an accumulation by the catalyst particles of only that amount of combustible contaminants which may be burned in the regenerating step to store in the catalyst sufficient heat for conducting the cracking reaction, thus establishing a substantial thermal balance between the reaction and regenerating steps. However, with most charging oils the degree of cracking which will give this thermal balance results in a relatively low yield of the desired gasoline product. The features of the invention are particularly intended to overcome this difficulty so that the process may be operated at a satisfactory higher conversion level.

Assuming for the sake of illustration that it is desirable to operate the reactor under conditions which will give an additional 1% of combustible catalyst deposit, based on the charging stock, over that required for thermal balance, this will mean an additional 120 pounds of combustible contaminants per hour to be burned in the regenerating step at the oil charging rate above specified. Figuring the heat of combustion of these catalyst contaminants at an average of 14,300 B. t. u.'s per pound, an excess of heat for thermal balance amounting to 1,716,000 B. t. u.'s per hour will be evolved in the regenerating step. With regeneration accomplished in the preferred manner, by using undiluted air as the oxidizing medium, it may be assumed that approximately one-third of this excess heat will be carried from the regenerator in the outgoing combustion gases. This will leave approximately 1,144,000 B. t. u.'s per hour to be extracted from the catalyst in that portion of its circuit exterior to the reaction and regenerating zones. Since these figures are only approximate, heat lost from the system to the atmosphere by radiation and convection will be neglected and we will assume that the total 1,144,000 B. t. u.'s per hour is to be abstracted from the catalyst in the gas-lift transfer line or lines and supplied to the transporting fluid.

We will consider that only one gas-lift transfer line is employed, the system being arranged with the reactor mounted above the regenerator and the catalyst discharged from the stripping vessel succeeding the regenerator transported by gas-lift to a hopper mounted above the reactor. Say the desired temperature for the catalyst entering the reactor is 975° F. and that the transporting fluid employed is light distillate recovered from within the system which is vaporized by contact with the hot regenerated catalyst and is heated in the transfer line from substantially atmospheric temperature to approximately the temperature (975° F.) at which the catalyst is to be supplied to the reactor. The latent heat of vaporization and the sensible heat to be acquired by the transporting fluid will, in this instance, amount to approximately 750 B. t. u.'s per pound. Dividing this figure into that representing the excess heat to be extracted from the catalyst in the transfer line (1,144,000 divided by 750) we find that approximately 1,525 pounds per hour of transporting fluid will be required for cooling. Using a 60° A. P. I. gravity distillate as the transporting fluid, this means approximately 6 barrels per hour or say 150 barrels per day, in round figures, will be required for cooling in the transfer line when the catalyst deposit is increased 1% based on the charging oil.

To arrive at the quantity of the aforesaid distillate required to transport the catalyst in the gas-lift transfer line, we will assume that a catalyst-oil ratio of 7½ is required in the reaction zone to avoid an excessive drop in temperature through the catalyst bed. At the charging rate of 12,000 pounds of oil per hour, the rate of catalyst circulation through the system will then be 90,000 pounds per hour. Assuming an average loading in the gas-lift transfer line of 1½ pounds of catalyst per cubic foot of transporting vapor, the quantity of vapor required for transporting the catalyst is 135,000 cubic feet per hour. With an average temperature of say 500° F. in the transfer line and an average pressure of say 5 pounds gauge, the quantity of 60° A. P. I. gravity distillate required to produce this amount of vapor is approximately 450 barrels per day.

It will be apparent from the above that, under the conditions given, the quantity of transporting fluid required for cooling will substantially correspond to that required for effecting transportation of the catalyst when the quantity of combustible contaminants burned from the catalyst in the regenerating step exceeds that required for inherent thermal balance by 3%, based on the charging oil. In most cracking operations, the catalyst deposit which will give an inherent thermal balance between the reaction and regenerating steps amounts from 1 to 2%, based on the charging oil. In the operation above considered, this figure can be increased to as much as 4 to 5%. This is within the range of catalyst deposits ordinarily experienced in commercial cracking operations producing satisfactory high yields of good antiknock gasoline.

In case the catalyst deposit encountered at the conversion level selected burns in the regenerator to store less excess heat in the catalyst than the transporting fluid required will remove, the cooling effected in the transfer line may be correspondingly reduced by preheating the transporting fluid before it is introduced into the transfer line to a temperature which will reduce its heat pick-up in this zone to the required value. Alternatively or in conjunction with this preheating of the transporting fluid, a material of lower molecular weight may be employed as the transporting fluid, thereby reducing its cooling effect. For example, normally gaseous fractions such as butanes and butenes may be used. There is also some leeway in the catalyst loading which may be employed in the transfer line and the temperature to which the catalyst is cooled will vary in indirect relation to this loading, other features being the same. For example, the catalyst loading may be decreased to say 1 pound or a fraction thereof per cubic foot of vapor to obtain more cooling of the catalyst or, in most instances, it may be increased to 2 pounds and sometimes more to obtain less cooling of the catalyst. Also, in an operation such as above given, the amount of cooling obtained in the transfer line can be increased, when desired, by employing a transporting fluid of higher molecular weight and/or the catalyst-oil ratio may be increased and/or the catalyst loading in the transfer line reduced.

I claim:

1. In a method of catalytically converting hydrocarbons wherein a fluid hydrocarbon is endothermically reacted in a reaction zone containing a relatively compact bed of solid catalyst particles whereby combustible contaminants are accumulated by the catalyst, the resultant contaminated catalyst is transferred from said reaction zone to a separate regeneration zone, said combustible contaminants are burned from the catalyst by contacting an oxygen-containing gas with a relatively compact bed of said contaminated catalyst in said regeneration zone, and the resultant regenerated catalyst is transferred to said reaction zone, and wherein the system is thermally unbalanced in that the exothermic heat evolved in the regeneration step is in substantial excess of the endothermic heat required in the reaction step, the improvement which comprises bringing the system into approximate thermal balance by transferring catalyst from one of said zones to the other by means of a transporting fluid comprising a low boiling hydrocarbon, controlling the quantity and temperature of said transporting fluid to remove from the catalyst during transfer thereof an amount of heat substantially equivalent to said excess of said exothermic heat over said endothermic heat, and separating said transporting fluid from the catalyst prior to the introduction of said catalyst into the zone to which it is being transferred.

2. In a method of catalytically converting hydrocarbons wherein a fluid hydrocarbon is endothermically reacted in a reaction zone containing a relatively compact bed of solid catalyst particles whereby combustible contaminants are accumulated by the catalyst, the resultant hydrocarbon reaction products are supplied to a separation zone for the recovery of desired fractions, the contaminated catalyst is transferred from said reaction zone to a separate regeneration zone, said combustible contaminants are burned from the catalyst by contacting an oxygen-containing gas with a relatively compact bed of said contaminated catalyst in said regeneration zone, and the resultant regenerated catalyst is transferred to said reaction zone, and wherein the system is thermally unbalanced in that the exothermic heat evolved in the regeneration step is in substantial excess of the endothermic heat required in the reaction step, the improvement which comprises bringing the system into approximate thermal balance by transferring catalyst from one of said zones to the other by means of a transporting fluid comprising a low boiling hydrocarbon, controlling the quantity and temperature of said transporting fluid to remove from the catalyst during transfer thereof an amount of heat substantially equivalent to said excess of said exothermic heat over said endothermic heat, substantially completely separating the catalyst from the transporting fluid prior to the introduction of the catalyst to the zone to which it is being transferred, and introducing the thus separated transporting fluid to said separation zone.

3. The process of claim 1 wherein said transporting fluid comprises selected normally liquid fractions of the hydrocarbon conversion products of the process.

4. The process of claim 1 wherein said transporting fluid comprises selected normally gaseous fractions of the hydrocarbon conversion products of the process.

5. The process of claim 1 wherein said transporting fluid is heated to a predetermined temperature, less than that of the solid particles with which it is to be commingled, and is utilized in the transfer of catalyst in essentially vaporous state.

6. The process of claim 1 wherein said transporting fluid is commingled in essentially liquid state with the solid particles which it transports and is vaporized by heat derived from said particles.

7. The process of claim 1 wherein the endothermic reaction comprises the cracking of hydrocarbon oil, said solid catalyst particles comprise a cracking catalyst, and said transporting fluid comprises selected normally liquid fractions of the cracked products.

8. The process of claim 1 wherein the endothermic reaction comprises the cracking of hydrocarbon oil, said solid catalyst particles comprise a cracking catalyst, and said transporting fluid comprises relatively heavy normally gaseous fractions of the cracked products.

9. The process of catalytically cracking hydrocarbon oil which comprises maintaining a relatively compact bed of solid cracking catalyst particles in a confined reaction zone, contacting said oil in essentially vaporous state with said bed in the reaction zone and effecting its cracking therein with a resulting accumulation of combustible contaminants by the catalyst particles, removing contaminated catalyst from said bed in the reaction zone and supplying it to another relatively compact bed thereof maintained in a separate confined regenerating zone, contacting oxidizing gas with the bed in the regenerating zone and thereby burning combustible contaminants from the catalyst particles to regenerate the latter and store heat therein, the exothermic heat evolved during said burning being in substantial excess of the endothermic heat required in the cracking step, removing resulting regenerated catalyst from the bed in the regenerating zone and returning it to said bed in the reaction zone for further use in promoting the cracking reaction and to supply heat to the latter, effecting the transfer of catalyst particles from the reaction zone to the regenerating zone with the aid of a transporting fluid comprising a relatively low boiling hydrocarbon with which the catalyst particles are commingled following their discharge from the reaction zone and from which they are substantially separated prior to their introduction into the regenerating zone, and utilizing said transporting fluid in a quantity and at a temperature regulated to remove from the catalyst during transfer thereof an amount of heat substantially equivalent to said excess of said exothermic heat over said endothermic heat.

10. The process of catalytically cracking hydrocarbon oil which comprises maintaining a relatively compact bed of solid cracking catalyst particles in a confined reaction zone, contacting said oil in essentially vaporous state with said bed in the reaction zone and effecting its cracking therein with a resulting accumulation of combustible contaminants by the catalyst particles, removing contaminated catalyst from said bed in the reaction zone and supplying it to another relatively compact bed thereof maintained in a separate confined regenerating zone, contacting oxidizing gas with the bed in the regenerating zone and thereby burning combustible contaminants from the catalyst particles to regenerate the latter and store heat therein, the exothermic heat evolved during said burning being in substantial excess of the endothermic heat required in the cracking step, removing resulting regenerated catalyst from the bed in the regenerating zone and returning it to said bed in the reaction zone for further use in promoting the cracking reaction and to supply heat to the latter, effecting the transfer of catalyst particles from the regenerating zone to the reaction zone with the aid of a transporting fluid comprising a relatively low boiling hydrocarbon with which the catalyst particles are commingled following their discharge from the regenerating zone and from which they are substantially separated prior to their introduction into the reaction zone, and utilizing said transporting fluid at a temperature and in a quantity regulated to remove from the catalyst during transfer thereof an amount of heat substantially equivalent to said excess of said exothermic heat over said endothermic heat.

11. The process of claim 9 wherein said transporting fluid comprises normally liquid hydrocarbons of a lower boiling nature than the first named oil.

12. The process of claim 9 wherein said transporting fluid comprises selected relatively low boiling fractions of the hydrocarbon products resulting from said cracking operation.

13. The process of claim 9 wherein said transporting fluid comprises relatively heavy normally gaseous fractions of the hydrocarbon conversion products of said cracking operation.

14. The process of claim 10 wherein said transporting fluid comprises normally liquid hydrocarbons of a lower boiling nature than the first named oil.

15. The process of claim 10 wherein said transporting fluid comprises selected relatively low boiling fractions of the hydrocarbon products resulting from said cracking operation.

16. The process of claim 10 wherein said transporting fluid comprises relatively heavy normally gaseous fractions of the hydrocarbon conversion products of said cracking operation.

CHARLES H. ANGELL.